United States Patent [19]

Gay et al.

[11] Patent Number: 5,081,102

[45] Date of Patent: Jan. 14, 1992

[54] PREPARATION OF PRECURSOR SUPERCONDUCTOR METAL OXIDE POWDERS BY SPRAY CALCINATION FROM ATOMIZED NITRATE SOLUTION

[75] Inventors: Richard L. Gay, Chatsworth; LeRoy F. Grantham, Calabasas, both of Calif.

[73] Assignee: Rockwell International Corporation, El Segundo, Calif.

[21] Appl. No.: 268,924

[22] Filed: Nov. 9, 1988

[51] Int. Cl.$^5$ .................. C01F 1/00; C01F 11/04; C01F 17/00

[52] U.S. Cl. .................. 505/1; 423/593; 505/737

[58] Field of Search .................. 505/1, 737; 423/593

[56] References Cited

U.S. PATENT DOCUMENTS

| | | | |
|---|---|---|---|
| 3,101,258 | 8/1963 | Johnson | 159/4.01 |
| 3,989,446 | 11/1976 | Grill et al. | 159/4.02 |
| 4,499,833 | 2/1985 | Grantham | 252/623 |
| 4,559,170 | 12/1985 | Gay et al. | 252/632 |
| 4,579,069 | 4/1986 | Gay et al. | 252/632 |
| 4,668,435 | 5/1987 | Grantham | 252/632 |

FOREIGN PATENT DOCUMENTS 0791701  12/1980  U.S.S.R. .

OTHER PUBLICATIONS

Kikuchi et al., "Synthesis and Superconductivity of a New High-T$_c$ ... ", Japanese Journal of Applied Physics, vol. 27, No. 6, Jun. 1988, pp. L1050–L1053.

Iijima et al., "Intergrowth Structures in Superconductor Tl–Ba–Ca–Cu–O Oxides", Jap. Journal Appl. Phys., vol. 27, No. 6, Jun. 1988, pp. L1054–L1057.

Tohge et al., "Direct Preparation of Uniformly-Distributed YBa$_2$Cu$_3$O$_{7-x}$ ... ", Jap. Journal Appl. Phys., vol. 27, No. 6, Jun. 1988, pp. L1086–L1088.

Suyama et al., "Characterization and Sintering of Mg–Al Spinel Prepared ... ", Ceramics International, vol. 8, No. 1, Feb. 1982, pp. 17–21.

Kodas et al., "Aerosol Flow Reactor Production of Fine YBa$_2$Cu$_3$O$_7$ Power: ... ", Applied Physics Letters, vol. 52, No. 19, May 19, 1988, pp. 1622–1624.

Kawai et al., "Formation of Y–Ba–Cu–O Superconducting Film by a Spray ... ", Japanese Journal of Applied Physics, vol. 26, No. 10, Oct. 1987, pp. L1740–L1742.

IBM, "Superconducting Oxide Films by Pyrolysis", IBM Technical Disclosure, vol. 31, No. 3, Aug. 1988.

Henry et al., "Thin Film Growth of YBa$_2$Cu$_3$O$_7$ by Spray Pyrolysis", Journal of Crystal Growth, vol. 92, Nos. 1/2, Oct. 1988.

Keller et al., "Superconductivity in YBa$_2$Cu$_3$O$_x$ for x Greater than 7", Chemistry of High-Temperature Superconductors, ACS, Sep. 4, 1987.

*Primary Examiner*—R. Dean
*Assistant Examiner*—David W. Schumaker
*Attorney, Agent, or Firm*—H. Fredrick Hamann; Harry B. Field; Henry Kolin

[57] ABSTRACT

A spray calcination process is provided for decomposing a metal nitrate solution to form fine grain multicomponent metal oxide powders of selected composition of particular utility as superconductor precursor powders. Such precursor powders are produced in bulk quantities as high purity, reproducible, intimately mixed powders for conversion to high temperature superconductors.

A metal nitrate solution containing two or more metal constituents in a preselected ratio is sprayed as a finely atomized spray into a spray calcination zone where it is contacted with a hot gas stream for a residence time of less than 15 seconds at a high temperature between 200° C. and 1100° C. sufficient to vaporize the water of the nitrate solution and convert the metal nitrates to their corresponding oxides. The formed metal oxides are recovered from the gas stream as the desired metal oxides powders of selected composition which, where required, may be further sintered to form the desired superconducting metal oxide ceramics such as the Y–Ba–Cu–O and Tl–Ba–Ca–Cu–O superconductors.

7 Claims, 2 Drawing Sheets

PREPARATION OF PRECURSOR SUPERCONDUCTOR METAL OXIDE POWDERS BY SPRAY CALCINATION FROM ATOMIZED NITRATE SOLUTION

BACKGROUND OF THE INVENTION

1. Field of the Invention

This invention relates to the preparation of metal oxide powders, and more particularly to their preparation by spray calcination. In one of its more particular aspects, this invention relates to the preparation of fine grain multicomponent metal oxide powders of selected composition for conversion to their corresponding superconducting metal oxide ceramics.

2. Prior Art

Superconductivity is the property of certain materials at cryogenic temperatures approaching absolute zero to carry electric currents without power dissipation. Commercial superconductors such as niobium alloys do not reach the superconductive state until chilled below 23° K. This requires the use of liquid helium, which condenses at 4° K. However, more recently, new high-temperature superconductors showing a superconductive transition temperature well above 77° K., allowing liquid nitrogen to be used as cryogenic fluid, have been reported by various laboratories. The high-temperature superconductive materials presently being studied consist of various metal oxides bonded together in a complex ceramic-like structure. For example, a typical laboratory recipe calls for heating an intimate mixture of the oxide or carbonate powders of the solid elements at temperatures between 900° and 1100° C. to drive off carbon dioxide and other volatiles. After regrinding and reheating, the mixture is pressed into pellets and sintered at high temperatures for several hours. The pellets are annealed in an oxygen environment at a lower temperature between 400° and 500° C. The resulting ceramics tend to be brittle and fragile and cannot be drawn out to form wires as can copper and other ductile metals.

Attempts have also be made to prepare thin superconducting films from multiphase Y-Ba-Cu-O material using evaporative techniques. Other workers have fabricated tapes that superconduct above 90° K. by imbeddding ceramic particles in organic material.

Several laboratory approaches to the preparation of high-temperature superconductive materials have been reported. In *Rev. Sci. Instrum.* 58(9) September 1987, pages 1565-1571, Xiao-Dong et al have reported on the "Practical Preparation of Copper Oxide Superconductors" which involves use of either a solid state reaction method or a coprecipitation method. Each of these methods involve detailed laboratory steps preferably performed in a hood because of possible toxic problems involved.

Another approach involves the precipitation of superconductor precursor powders. A solution containing highly soluble metal salts is mixed with a solution containing highly soluble salts of precipitating anions. When the solutions are mixed, an insoluble precipitate is formed. The precipitate is heated to form the desired superconducting phases. This requires complex considerations relating to pH and anion control in the precipitation. Also, cation contamination is difficult to avoid and this generally interferes with the subsequent sintering and produces unwanted phases in the final ceramic.

Because of the laboratory-scale nature of the processes and the precise type of controls required when utilizing the mixed oxide or precipitation of oxides from solution, attempts have been made to adapt other techniques for the production of metal oxide powders. Thus, various single-component metal oxides are presently being produced by means of the thermal decomposition of the corresponding metal chloride solutions. Several spray roasting techniques have been proposed for the production of multicomponent ceramic powders (metal oxides). Since these techniques depend on the decomposition of metal chloride systems, incomplete transformations occur where the decomposition temperatures of the provided metal chlorides are too far apart.

Aerosol methods for the production of powders have been generally known. Recently, there has been described an experimental heated-wall apparatus, designated as an aerosol flow reactor, for the production of fine yttrium-barium-copper oxide powder for the fabrication of superconducting ceramics. Aerosol droplets of an aqueous solution of the Y, Ba and Cu nitrates in a 1:2:3 mole ratio are generated using two nebulizers, one capable of producing droplets with a mass median diameter of approximately 2 microns and the other of 0.5 micron. Pure oxygen is used as the carrier gas at a flow rate to provide an average residence time in the reactor of between 20 and 100 seconds. After the droplets are generated, the water vapor is removed by passing the droplets through a diffusion dryer. The dried particles are then passed through the reactor to convert the nitrates to the superconductive material. The powders are collected on high efficiency ceramic and glass fiber cartridge filters. The reported overall yield was approximately 50%, principally because of thermophoretic wall losses after the heated zone in the reactor.

In another process, aerosol droplets are formed from a water solution of dissolved metal nitrates and passed through a tubular furnace at temperatures of up to 1000° C. The water evaporates, the nitrates decompose and oxygen occurs forming the metal oxide compound in the form of a fine powder. The residence time in this reactor varied from 15 to 56 seconds.

Spray calcination processes are known for the thermal conversion of wastes and the reduction of the volume of low-level radioactive wastes which contain free water. Spray converters and spray dryers are used for contacting the wastes, generally in slurry form. The sprayed particles are contacted in the spray converter with a hot gas, which results in the drying of the waste and the calcining and combusting of the dried waste. Such spray processes are particularly useful with wastes containing hazardous material such as radioactive substances. Such spray converters and spray dryers are shown in U.S. Pat. Nos. 4,499,833; 4,559,170; 4,579,069; and 4,668,435.

All of the foregoing processes, while of interest and feasible to some extent, are open to various technical and economic objections which militate against their widespread commercial adoption. In general, many processing steps are required which are frequently costly and require precise handling. Yields are generally low because of the relatively complex processing involved. Relatively long residence times (usually many seconds) can give volatile components of the mixture an opportunity to separate from the mixture. Hence, these processes are generally of laboratory interest only, lacking with respect to ease of operability and commercial feasibility.

Accordingly, it is an object of the present invention to provide a commercially useful process for the preparation of fine-grain multicomponent metal oxide powders of selected composition.

It is a further object to provide a process for producing high-purity, reproducible, intimately mixed, superconductor precursor powders in bulk quantities for conversion to high temperature superconductors.

Another object is to provide a process which is capable of controlling the emissions of hazardous, toxic materials and which is readily amenable to the production of a wide variety of different multicomponent superconductor precursor powders in bulk quantities on a cost-effective basis.

Other objects and advantages of this invention will become apparent in the course of the following detailed description.

SUMMARY OF THE INVENTION

In general, the present invention provides a spray calcination process for decomposing a metal nitrate solution to form fine grain multicomponent metal oxide powders of selected composition. Such powders, for example, find particular utility in the electronics industry. In its more specific aspects, this process is of particular utility for the preparation of superconductor precursor powders. Accordingly, this invention will be described with particular reference to the preparation of such precursor powders.

In its broadest aspects, the metal nitrate solution containing two or more metal components is introduced into a spray calcination zone in the form of a finely atomized spray. The metal nitrate solution is prepared by having its metal components in a preselected ratio so that when the water of solution is removed and the resulting nitrates are decomposed to form oxides, a desired stoichiometry of the metal components is maintained. It is considered essential in order to maintain adequate decomposition and proper subsequent stoichiometry that only nitrate solutions be used.

At the same time that the metal nitrate solution is sprayed into the calcination zone, it is contacted by an externally heated hot gas stream introduced into the calcination zone at a temperature in the range of about 200 to 1100° C. and preferably between 500 and 1000° C. the temperature being sufficient to vaporize the nitrate solution and convert the metal nitrates to their corresponding oxides. Preferably the hot gas stream consists of an inert gas enriched with oxygen. This thermal conversion process of substantially simultaneous evaporation and calcination occurs in the spray calcination zone at a residence time of about 0.5 to 15 seconds, preferably between 1 and 10 seconds. Where a compound of a metal component is highly volatile at the elevated temperature present in the calcination zone, a residence time of between 1 and 3 seconds is particularly preferred.

The formed metal oxides are then separated from the gas stream as finely divided intimately mixed metal oxide powders of selected composition having the desired stoichiometry. These intimately mixed metal oxide powders, when prepared in a stoichiometry corresponding to that of superconductor precursor powders, may then readily be processed by further heat treatment involving sintering, pressing, thin-film formation, or the like.

It is an advantageous feature of the present invention that the metal nitrate feed solution may be adjusted in composition either initially or during the process run to yield the desired product stoichiometry. This is particularly useful when dealing with volatile compounds such as nitrates and oxides containing metal components such as thallium. Also, by adding an oxidizing agent such as $H_2O_2$, e.g. 3% $H_2O_2$, to the feed solution containing metals having multiple valence states, e.g., Cu and Tl, the metal component is converted to its highest valence state such as the conversion of $Tl^{+1}$ to $Tl^{+3}$. This further serves to reduce volatility and improve solubility.

The essential features of the present invention relate to the production of these intimately mixed metal oxide powders of desired stoichiometry, particularly suitable for conversion to superconductors, rather than to the preparation of specific types of rods, plates, or other ceramic forms of superconductors. The described process affords flexibility in preparing a wide variety of multicomponent superconductor powders in a desired stoichiometry utilizing two or more metals, provided soluble nitrates of the metal components are available. The number of metal components that may be used is basically limited only by considerations of the mutual solubilities of their nitrates. Generally, from 2 to 12 metal components may be conveniently used.

DESCRIPTION OF THE PREFERRED EMBODIMENTS

The apparatus shown schematically in U.S. Pat. No. 4,499,833 relating to the thermal conversion of wastes may be adapted and readily utilized for the practice of the present invention. The use of such modified equipment is advantageous in promoting the reliability of the present process and facilitating the production of superconductor precursor powders in bulk quantities.

Essentially any of the superconductor precursor powders for the known high-temperature superconductors may be prepared in accordance with the present process. Illustrative high-temperature superconductors are the following:

| Composition | Transition Temperature |
| --- | --- |
| $Ba_{0.6}K_{0.4}BiO_3$ | 30° K. |
| $YBa_2Cu_3O_{7-x}$ | 92° K. |
| $Bi_2CaSr_2Cu_3O_{9-x}$ | 110° K. |
| $Tl_2Ba_2Ca_2Cu_3O_{10+x}$ | 125° K. |

Figure 1:
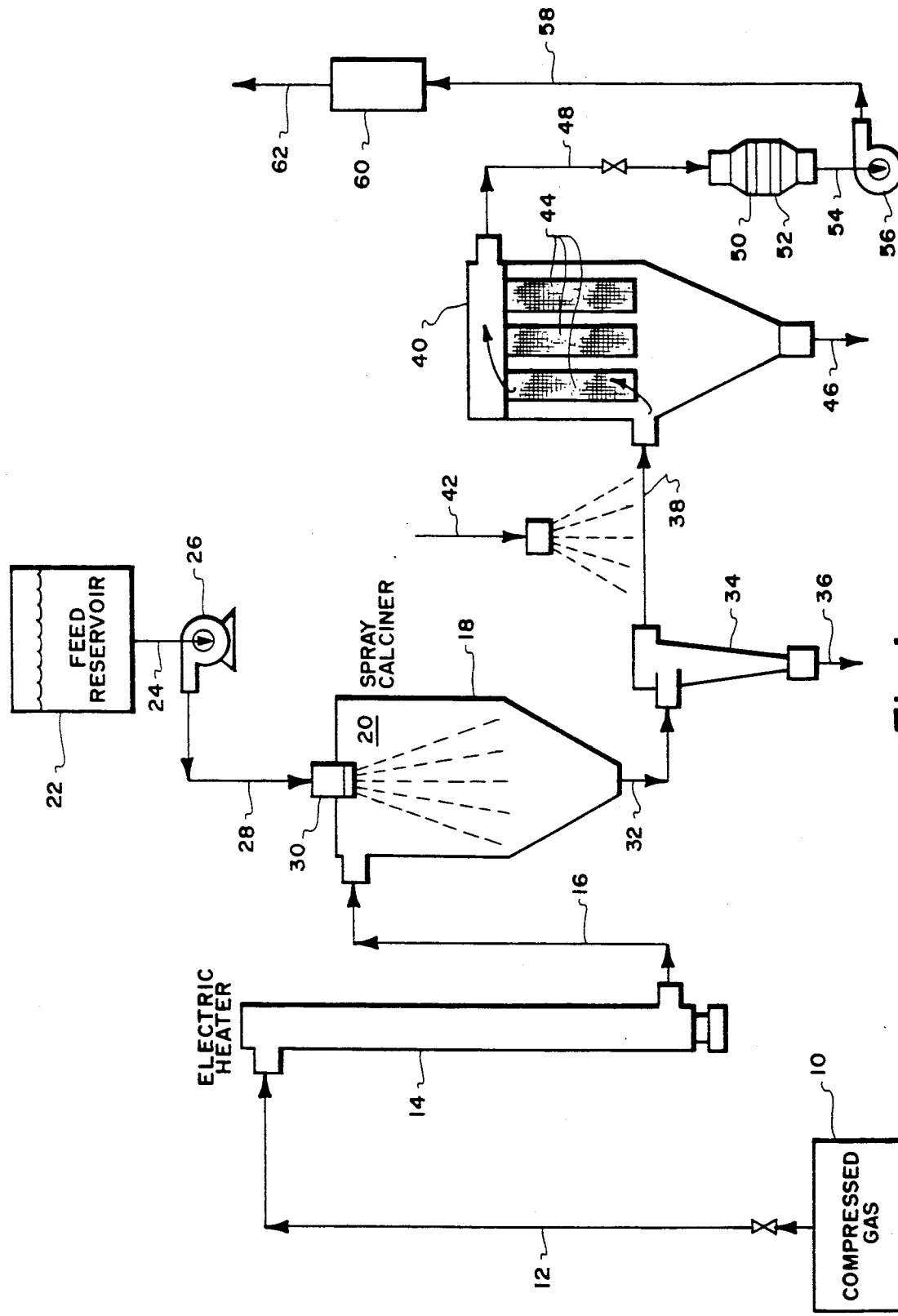
FIG. 1 is a schematic flow diagram illustrating an embodiment of the process of the present invention.

FIG. 1 illustrates an apparatus suitable for carrying out the process of the present invention. A pressurized gas, suitably nitrogen, oxygen or air, preferably a mixture of $N_2$ and $O_2$, contained in a cylinder 10 is fed through a valved conduit 12 to an electric heater 14 and from there via a conduit 16 to a spray calciner 18. This externally heated gas is introduced into the spray calcination zone 20 of the spray calciner 18 at a temperature in the range of 200° to 1100° C., preferably between 500° and 1000° C. A feed reservoir 22 contains a multicomponent metal nitrate solution. This solution contains at least two metal components in a desired stoichiometric ratio and is generally prepared using water-soluble nitrate salts and may be sightly acidified by dilute nitric acid. This serves to remove dissolved CO₂ or decompose any carbonates present. The nitrate solution is fed from reservoir 22 via a conduit 24 to a pump 26, which then pumps it via a conduit 28 to one or more spray nozzles shown schematically as a nozzle 30. The nitrate solution spray nozzles are adjustable to produce spray droplets as small as 1 to 2 microns in diameter and also, where desired, droplets of 10 to 50 microns in diameter. These larger size droplets will result in the formation of smaller-sized hollow spherical powder particles, typically from 1 to 10 microns in diameter. This facilitates ease of oxygenation of powder processing to desired shapes.

The externally heated hot gas stream contacts the finely sprayed droplets in the spray calcination zone 30 and vaporizes the nitrate solution and converts the metal nitrates to their corresponding oxides. This conversion in the spray calcination zone takes place extremely rapidly at a residence time within the zone of about 0.5 to 15 seconds, generally and preferably between 1 and 10 seconds. An even shorter residence time, between 1 and 2 seconds, is preferred for the treatment of volatile metal components. The gas stream exits the spray calciner 18 via a conduit 32 to a cyclone separator 34. Most of the oxide powder, which has an average particle size between 1 and 50 microns in diameter, and is in the form of hollow spherical particles, is collected in cyclone separator 34 (also referred to as a centrifugal dust collector) and is recovered via a conduit 36.

The gas stream from cyclone separator 34 passes through a conduit 38 to a baghouse 40. At the same time, just prior to entry of the hot gas into the baghouse, a cooling spray is applied through a conduit 42 so as to cool the gas entering the baghouse. There, substantially all the remaining finely divided powder having an average particle size of 1 to 2 microns in diameter is collected on the baghouse filters 44. Some product is also obtained from the baghouse through a conduit 46.

Alternatively, the calciner product gas can be cooled by rapidly quenching it with dilution gas, preferably $N_2$, or with a very fine water spray added at the calciner outlet (quench arrangement not shown). Another rapid cooling technique involves adding a fine spray mist of water introduced directly into the calciner outlet gas for the purpose of rapidly quenching the gas temperature and inhibiting the volatility of volatile oxides, e.g., thallium oxide or copper oxide, or that of incompletely or partially decomposed corresponding nitrates The cooled gas leaves the baghouse 40 via a valved conduit 48 and passes to a prefilter 50 and a HEPA filter 52 to remove from the gas stream any remaining traces of finely divided metal oxide powder. It should be noted that an electrostatic precipitator (not shown) can be used for solids collection instead of baghouse 40. The cooled gas then leaves the HEPA filter system via a conduit 54 and is directed by a blower 56 via a conduit 58 to a plant stack 60 and then exhausted to the atmosphere via a conduit 62.

The spray calciner is preferably operated at a slight negative pressure (generally about 3.8 mm of $H_2O$ minimum). This safeguards against any possible emission of toxic or hazardous components from the system.

Ordinarily, oil or natural gas is used as a relatively inexpensive fuel source for making the high-temperature calcining gas. However, such an oil or natural gas burner could produce about 4 to 5% $CO_2$ in the calciner gas. This could make difficult the control in the precursor powder of an impurity such as $BaCO_3$ formed by the reaction of barium with $CO_2$ in the calciner gas. However, by using electric heat as the thermal source and eliminating the natural gas-air burner, the $CO_2$ concentration in the calcining gas is brought down to about 0.03%, namely, that in air, or much smaller if $N_2$ is used. However, where $N_2$ is used, a small amount of pure $O_2$ is added to maintain oxidizing conditions. Typically, the added $O_2$ is in the concentration range of 1–20% by volume. Under certain circumstances where hydrogen is readily available, it may be burned to provide the high temperature calcining gas.

Because the use of a compressed gas such as nitrogen or oxygen is relatively costly, it is desirable to recycle the hot gas to decrease the cost. A heat exchanger may also be used as a possible heat source in a controlled composition heated gas stream.

In FIG. 2 is shown a suitable hot gas recycle system for the spray calciner, similar numerals to those used in FIG. 1 being used in FIG. 2 to represent corresponding parts. Referring to FIG. 2, the pressurized compressed gas contained in a cylinder 10 is fed through a valved conduit 12 to an electric heater 14. Conduit 12 also serves to bring needed makeup gas from cylinder 10 to heater 14. The heated gas is then fed via a conduit 16 into the spray calcination zone 20 of a spray calciner 18 at a temperature in the range of 200–1100° C., preferably between 500 and 1000° C. A feed reservoir 22 contains a multicomponent metal nitrate solution substantially identical to that shown in FIG. 1. As described for FIG. 1, this nitrate solution is sprayed into the spray calciner 18 and then removed therefrom to a cyclone separator 34 by way of a conduit 32.

The gas stream from cyclone separator 34 passes through a conduit 64 to a heat exchanger 66, where it is cooled, and then by way of a conduit 68 to a baghouse 40.

After collection of product on the baghouse filters 44, the cooled gas leaves the baghouse 40 via a valved conduit 68 to a blower 70 and then via a conduit 72 to a scrubber-condenser 74. The condensate is fed via a conduit 76 to a pump 78 and a conduit BO to the feed reservoir 22. Provision is also made for separately removing of the condensate from the system by way of a valved conduit 82 for use in preparing more feed solution to refill feed reservoir 22. The relatively cool gas passing through scrubber condenser 74 is fed via a valved conduit 84 to a blower 86 through heat exchanger 66 and returned to electric heater 14 for recycle in the system. In passing through heat exchanger 66, the cooled gas is heated on its way to the electric heater by heat exchanging relationship with the relatively hot gas leaving the cyclone separator 34. Provision is also made for recycle of hot gas by way of valved conduit 88.

By utilizing the recycle system shown in FIG. 2, the need for the external cooling spray 42 shown in FIG. 1 is eliminated. In addition, the requirements for makeup gas losses are also substantially reduced, further providing considerable savings in the costs of using compressed gas.

The invention may be better understood by reference to the following examples which are intended to be illustrative of the process of the present invention and not in any way limitative thereof.

EXAMPLE 1

Preparation of $YBa_2Cu_3O_{7-x}$

The high temperature superconductor, $YBa_2Cu_3O_{7-x}$ (123) was prepared from calcined nitrate solutions using the spray calcination technique of the present invention in a spray dryer modified to obtain temperatures sufficiently high to calcine the nitrate solution to oxide powders. This powder was then consolidated by being sintered into 123 superconducting rods.

Preparation of Y-Ba-Cu 123 Powder

Yttrium, barium and copper nitrates (99.9% pure or greater) were obtained and analyzed for oxide content by decomposing small samples at 700° C. Appropriate amounts of these nitrates were dissolved in water to form an intimately mixed oxide powder of the 123 composition after calcination. Since barium nitrate has limited solubility (87 g/liter) it was found that dilute solutions (43.3 grams dissolved nitrate/liter) had to be used to solubilize all components of the feed. It was also found that these solutions had to be somewhat less (~75%) than saturated in order to keep the spray nozzle clean for prolonged periods.

After calcining temperatures of 900° C. inlet and 700° C. outlet were reached, the calciner was run for 13 hours. The residence time within the calciner zone was about 2 seconds. Two slight adjustments of the feed rate were the only changes made on the calciner during the entire 13 hours. During that time 35 kg of aqueous nitrate solution were fed at the rate of approximately 45 g/min. The feed was ~0.1M $HNO_3$ to eliminate $CO_2$ in the feed solution. A portion of the prepared product, about 150 gms, was collected on a prefilter, with the balance being collected on the HEPA filter.

The cyclone-received product had a bulk density of 0.50 g/cm$^3$ and a tap density of 0.70 g/cm$^3$; the filter product had a bulk density of 0.22 g/cm$^3$ and a tap density of 0.32 g/cm$^3$.

The higher the density the easier it is to process the material into desired products and shapes. Therefore the product density should be as high as possible. We have found that by recycling some of the low density powder, the cyclone product tap density was increased to as high as 1.2 g/cm$^3$. nozzle. A two-fluid nozzle requires a constant source of high-pressure atomizing gas to disperse the solution into micron-sized droplets. In general, high-pressure 550 kPa facility-supplied air is used, however, separate air compressors have also been used.

Heating System

Figure 2:
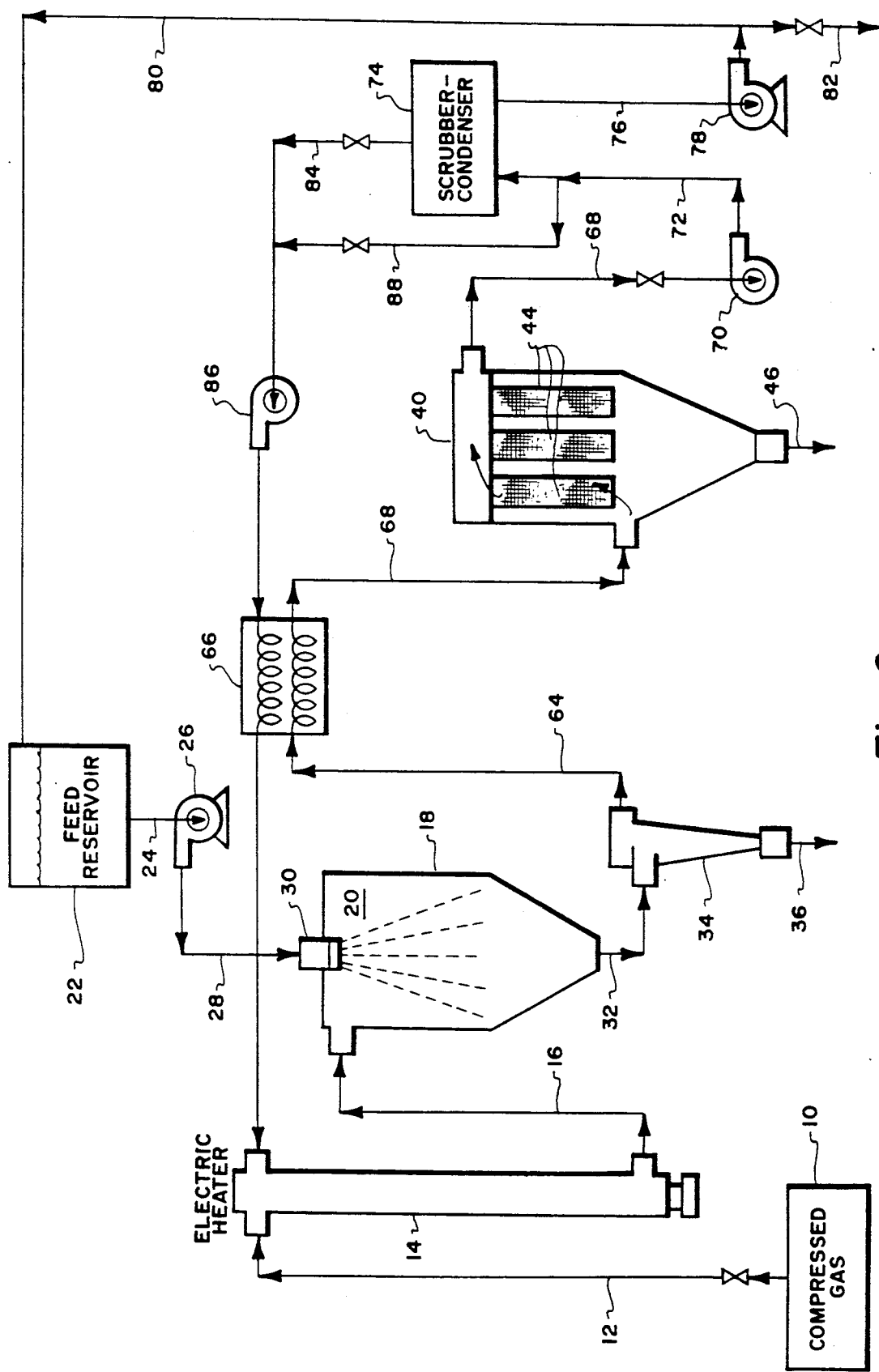
FIG. 2 is a schematic flow diagram utilizing recycle as an embodiment of the process of the present invention.

An electric heater 14 as shown in FIGS. 1 and 2 is generally preferred for use with nitrogen drying gas in the system, particularly where components of air or combustion products react with calcined products.

For the preparation of the Y-Ba-Cu 123 powder, a natural gas fired heating system was used consisting of a gas supply system, a burner, burner control and temperature measuring system. The natural gas burner is equipped with a multitude of safety systems to prevent explosions, over temperatures and under temperatures and control systems to assure a constant heat generation system. Temperatures throughout the system are measured with thermocouples and recorded.

Off-Gas System

The off-gas system consists of a particulate separation system, a flow measuring meter, an induced draft fan and gas filtration system. A cyclone is used to remove a majority of the larger particulates while a roughing filter, prefilter, and HEPA (High Efficiency Particulate Air) filter are used to remove smaller particulates (>99.97% of 0.1-micron particles). Flow in the system is measured with an annubar. A 46-cm diameter induced draft fan is used to provide ~5.7 std m$^3$/min flow through the system.

Spray Calciner

The spray calciner used was a 75-cm-diameter modified and converted spray dryer. A natural gas heating system was used with a burner capacity of 88,000 kcal/hr and a blower capacity of 125 m$^3$/min. Butterfly valves (not shown) were installed on the outlet duct to control the gas flow through the calciner and the amount of dilution air added before the blower. The spray calciner system was operated at negative pressure (3.8 mm of $H_2O$ minimum) in a room that was at negative pressure (1.5 mm of $H_2O$ minimum). The pressure drop across the calciner was about 25 mm of water, and the pressure drop across the cyclone was about 100 mm of water during operation. The pressure drop across the blower was ~35 cm of water. The temperatures in the calciner system were measured at about 30 points and were recorded continuously.

Feed System

For solution feed, a stirred plastic reservoir on a digital readout balance is generally used. Stirred heated feed tanks on a digital balance have also been utilized.

The solution metering pump is sized to deliver the desired flow rate at about 690 kPa. In order to maintain a constant flow at the required set point, it is important to assure that a constant feed supply be supplied to the pump and that no air bubbles or cavitation occurs during feeding.

The dispersal nozzle is designed for the feed material being fed to the calciner. Solids and slurries utilize a two-fluid-impact plate dispersal system while solutions utilize a single- or two-fluid spray

Description of Powder

The brown calciner powder is composed of discrete spheres ~0.5 to 10 microns in diameter. Photomicrographs indicate that essentially all of the powder (collected from the prefilter) is in the form of discrete spheres down to ~0.1 micron; no irregular-shaped powder is present. These spheres are thin, hollow spheres which accounts for the low density but high reactivity of the product. Because of openings in the spheres, oxygen diffusion into the powder and spheres is enhanced. This occurs as the product is consolidated into desired shapes by hot isostatic pressing when a small pressure of oxygen was maintained in the high-pressure cannister.

Preparation of Superconducting Rods

A small amount of this calciner powder was converted to 123 superconducting rods. Eight 4 mm dia×25 mm (⅛"×1") rods were prepared.

To prepare the superconducting rods, the sample from the prefilter was cold isostatically pressed into rod shapes at 276 MPa. The rods were removed from the dies and heated at a rate of ~80°/hr to 900° C. in flowing oxygen. The brown powder turned to the black 123 color when it reached ~600-700° C. during the initial heat up. The rods were held at 900° C. for ~40 hours and then cooled at 80° C./hr to 500° C. where it was held in flowing oxygen for another 40 hours. The rods were then cooled at 80°/hr to room temperature. Pieces of the rods were pulverized and X-ray diffraction patterns were run.

Superconductor 123 was the major phase present. Other materials identified were $BaCO_3$ from $CO_2$ in the calciner gas. and perhaps a trace amount of $Y_2O_3$. No 211 ($Y_2BaCuO_5$ or green phase) was found.

The foregoing Example 1 is illustrative of the calcination method which is considered to be generic to the preparation of ceramic superconductors of various compositions. It has the advantage of producing mixed oxide powders that are homogeneous on an atomic scale and eliminates compositional inhomogeneities in the product.

EXAMPLE 2

Preparation of Tl-Ba-Ca-Cu-O Superconductor (2122 Powder)

The calciner used in Example 1 was modified to use the electric heater 14 as shown in FIGS. 1 and 2. The system was run under a slight negative pressure (5 to 50 mm $H_2O$) in order to control toxic outleakage. The electrical gas heater provided 180 kW. The compressed gas 10 consisted of a high pressure supply of nitrogen and oxygen gas. Nitrate solutions were prepared. The feed solutions were prepared directed toward the superconductor Tl-Ba-Ca-Cu having the 2223 composition. After a test of 24 hours, analysis of the feed solution cyclone catch and baghouse catch by inductive coupled plasma spectroscopy (ICP) showed that the feed solution was very close to the target composition, but the cyclone catch was deficient in thallium and copper, and the baghouse catch had excess thallium and copper.

A coaxial nozzle was used to provide essentially simultaneous as well as essentially instantaneous contact (residence time of about 2 seconds) between the hot nitrogen gas (oxygen enriched) and the aqueous nitrate containing solution. A superconducting pellet was fabricated from the powder collected in the cyclone. This powder was pressed at 345 MPa and then converted to the superconductive state by being heated for 2 minutes at 880° C. in 100% oxygen followed by rapid cooling for 20 minutes. Although there was some residual nitrate in the powder, the two minute treatment at 880° C. decomposed the residual nitrate and converted the powder to a superconductor. This was confirmed by x-ray diffraction compound identification which showed its crystalline state and identified 2122 superconductor peaks and the absence of any $Ba(NO_3)_2$, $Tl_2O_3$, or CuO peaks. Mechanically, the finally fabricated product was found to be much denser and much harder than those prepared from mixtures of solid nitrates. The superconducting temperature in a plotting of temperature versus resistance showed a superconducting transition temperature of $T_c = 80°$ K.

Pellets fabricated by conventional techniques by pressing and sintering mixtures of solid oxides derived from thermal decomposition of solid nitrates are very porous and soft and sometimes flake apart even after they have been fired. Pellets prepared from the calciner powder were very dense and very hard.

Despite the known toxicity and volatility of thallium compounds, the process by its short residence time, negative almospheric pressure, and ultrafiltration capabilities controlled possible volatility and toxicity effects.

EXAMPLE 3

Preparation of Superconductor using Adjustment of Feed Composition (2223 Powder)

The calciner used in Example 2 was utilized for Example 3 under essentially the same conditions as described in Example 2.

The purpose of these test runs was to demonstrate that the product composition could be adjusted by making changes in the feed composition. The results of the test run showing adjustment of feed composition are given in Run 2 of the attached Table 1.

Most of the powder product from the test runs was collected in the cyclone separator. The cyclone collected about 30 g/hr and the baghouse collected about 1 g/hr. The cyclone product composition remained very constant during the time that the feed composition was held constant.

The data in Table 1 indicate that the thallium and copper content of the product could be increased by increasing the thallium and copper concentration in the feed solution. Also, during Run 2 hydrogen peroxide (3 wt % aqueous solution) was added to the feed solution. The peroxide oxidized the thallium (1) to thallium (III) and increased the solubility of the metal nitrate salts. The test results also indicate that the iron impurity level of the cyclone powder product decreased with time. This is attributed to the build-up of a protective layer of powder on the calciner wall.

The final cyclone product from Run 2 was pressed into a 2-cm diameter pellet and sintered at 880° C. for 10 minutes in an oxygen environment. The pellet exhibited a complete superconducting transition at a temperature of 90° K., with indications of a minor transition at 125° K. This pellet was sintered at 880° C. for 4 hours and exhibited a complete transition at approximately 110° K. Compound identification by x-ray diffraction confirmed its crystalline state to correspond to the 2223 superconducting composition.

TABLE 1

High Temperature Superconductor Calciner Test Results
Product and Feed Composition (atomic ratio)

| | Tl | Ba | Ca | Cu | Fe | Feed Adjustment |
|---|---|---|---|---|---|---|
| Run #1 | | | | | | |
| Feed | 1.04 | 1.00 | 0.95 | 1.44 | | None |
| Cyclone | 0.30 | 1.00 | 0.94 | 0.60 | | |
| Baghouse | 1.12 | 1.00 | 0.99 | 1.97 | | |
| Run #2 Time, hr. | | | | | | |
| 2 Feed | 1.0 | 1.0 | 1.5 | 1.5 | — | None |
| 2 Cyclone | 0.31 | 1.0 | 1.4 | 0.39 | | |
| 2 Baghouse | 0.66 | 1.0 | 0.99 | 1.28 | | |
| 4 Feed | 1.0 | 1.0 | 1.5 | 1.5 | | None |
| 4 Cyclone | — | — | — | — | | |
| 4 Baghouse | 1.30 | 1.00 | 1.10 | 2.5 | 0.05 | |
| 7 Feed | 1.0 | 1.0 | 1.5 | 1.5 | | None |
| 7 Cyclone | 0.32 | 1.00 | 1.43 | 0.35 | 0.02 | |
| 7 Baghouse | 1.22 | 1.00 | 1.19 | 3.10 | | |
| 7.7 Feed | 1.0 | 1.0 | 2.0 | 1.5 | | increase Ca |
| 10 Cyclone | 0.33 | 1.00 | 0.88 | 0.41 | 0.018 | |
| 10 Baghouse | — | — | — | — | | |
| 10.4 Feed | 3.0 | 1.0 | 1.5 | 6.0 | | decrease Ca |
| 12 Cyclone | 0.53 | 1.00 | 1.58 | 1.00 | 0.009 | increase Tl, Cu |
| 12 Baghouse | — | — | — | — | | |
| 12.2 Feed | 3.0 | 1.0 | 1.5 | 7.5 | | increase Tl, Cu |
| 14 Cyclone | 0.68 | 1.00 | 1.46 | 1.50 | 0.007 | |

TABLE 1-continued

| High Temperature Superconductor Calciner Test Results Product and Feed Composition (atomic ratio) | | | | | | |
|---|---|---|---|---|---|---|
| | Tl | Ba | Ca | Cu | Fe | Feed Adjustment |
| 14 Baghouse | — | — | — | — | | |

While the foregoing examples have illustrated the preparation of various superconductors, it will be readily apparent that the techniques used are similarly applicable to the preparation of a wide variety of superconductors without substantially departing from the general procedure shown.

It will, of course, also be realized that various modifications can be made to the design and operation of the process of this invention without departing from the spirit thereof. For example, any metal component can be used in the metal nitrate solution provided a soluble form is available. Where the compound of the metal component is highly volatile, then the use of a very short residence time is particularly advantageous.

Also, where the metal component is not fully converted to its oxide during the spray calcination step, even at elevated temperatures, then sintering may be considered desirable. Further, product powders of differing stoichiometries may be mixed and sintered to yield a desired superconductor stoichiometry. However, at certain elevated temperatures and residence times it may be feasible to prepare the superconducting powder in a single stage without the need for the oxidation treatment required to process the precursor powder. Thus, while the principle, preferred design, and mode of operation of 1 he invention have been explained and what is now considered to represent its best embodiment has been illustrated and described, it should be understood that, within the scope of the appended claims, the invention can be practiced otherwise than as specifically illustrated and described.

We claim:

1. A heated gas spray calcination process for the preparation of fine grain multicomponent precursor superconductor metal oxide powders of specific composition which comprises:

introducing a metal nitrate solution in the form of a finely atomized spray into the top of a spray calcination zone, said metal nitrate solution having the metal components thereof in a specific ratio to provide a corresponding stoichiometry of the resultant precursor superconductor powders;

contacting said finely atomized spray at the time of its introduction into the spray calcination zone with an externally heated hot gas stream concurrently introduced into the top of said zone for a residence time of contact within said zone of about 0.5 to 15 seconds, said introduced hot gas stream providing a temperature in said zone in the range of about 200° C. to 1100° C. and sufficient to vaporize the nitrate solution and convert the metal nitrates to their corresponding oxides during said residence time in the spray calcination zone; and recovering the formed metal oxides from the gas stream exiting the spray calcination zone as finely divided, intimately mixed precursor superconductor metal oxide powders of specific composition.

2. The process according to claim 1 wherein the temperature in the spray calcination zone is maintained between 500° C. and 1000° C.

3. The process according to claim 2 wherein the residence time of contact between the finely atomized spray and the hot gas stream in the spray calcination zone is about 1 to 10 seconds.

4. The process of claim 3 wherein electric heat is used as the thermal source for the hot gas stream which consists essentially of nitrogen optionally containing up to 20 volume % oxygen and less than 0.03% carbon dioxide.

5. A heated gas spray calcination process for the preparation of a fine grain precursor superconductor metal oxide powder whose metal components consist essentially of thallium, barium, calcium and copper having respective atomic ratios of 2,2,2,3, which comprises:

introducing a metal nitrate solution in the form of a finely atomized spray into the top of a spray calcination zone, said metal nitrate solution having the thallium, barium, calcium and copper components thereof in a specific ratio to provide a stoichiometry of said precursor superconductor metal oxide powder corresponding to respective atomic ratios of 2,2,2,3;

contacting said finely atomized spray at the time of its introduction into the spray calcination zone with an externally heated hot gas stream concurrently introduced into the top of said zone for a residence time of contact within said zone of about 1 to 10 seconds, said introduced hot gas stream providing a temperature in said zone in the range of about 500° C. to 1000° C. and sufficient to vaporize the nitrate solution and convert the metal nitrates to their corresponding oxides during said residence time in the spray calcination zone; and recovering the formed metal oxides from the gas stream exiting the spray calcination zone as finely divided, intimately mixed metal oxide powders whose metal components consist essentially of thallium, barium, calcium and copper having respective atomic ratios of 2,2,2,3, said metal oxide powders being in the form of hollow spheroidal particles having an average diameter between 1 to 10 microns.

6. The process of claim 5 wherein the residence time in the spray calcination zone is between 1 to 2 seconds and electric heat is used as the thermal source for the hot gas stream which consists essentially of nitrogen optionally containing up to 20 volume % oxygen and less than 0.03% carbon dioxide.

7. The process of claim 6 wherein the gas exiting the spray calcination zone is rapidly quenched prior to its entry into a centrifugal dust collector in which the hollow spheroidal particles are collected.

* * * * *